(12) United States Patent  
Eder

(10) Patent No.: US 8,734,954 B2  
(45) Date of Patent: May 27, 2014

(54) TRANSPARENT POROUS SIO₂-COATING FOR A TRANSPARENT SUBSTRATE MATERIAL HAVING IMPROVED OPTICAL PROPERTIES

(75) Inventor: Florian Eder, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 314 days.

(21) Appl. No.: 12/733,678

(22) PCT Filed: Aug. 12, 2008

(86) PCT No.: PCT/EP2008/060592  
§ 371 (c)(1),  
(2), (4) Date: Mar. 15, 2010

(87) PCT Pub. No.: WO2009/037055  
PCT Pub. Date: Mar. 26, 2009

(65) Prior Publication Data  
US 2010/0227147 A1    Sep. 9, 2010

(30) Foreign Application Priority Data  
Sep. 13, 2007    (DE) .......................... 10 2007 043 653

(51) Int. Cl.  
*B32B 17/06*    (2006.01)  
*B32B 15/04*    (2006.01)  
*B05D 3/00*    (2006.01)  
*B05D 1/18*    (2006.01)  
*B05D 5/00*    (2006.01)  
*B32B 3/26*    (2006.01)

(52) U.S. Cl.  
USPC ........ 428/432; 428/304.4; 428/428; 428/689; 428/702; 427/331; 427/372.2; 427/373; 427/397.7; 427/532; 427/535; 427/541; 427/430.1; 427/162; 427/164; 427/165; 427/169

(58) Field of Classification Search  
USPC ......... 428/428, 432, 304.4, 689, 702; 65/395, 65/440, 17.2; 427/532, 535, 541, 331, 427/372.2, 373, 397.7  
See application file for complete search history.

(56) References Cited

U.S. PATENT DOCUMENTS

| 4,137,365 | A  |   | 1/1979  | Wydeven, Jr. et al. |
| 5,392,156 | A  |   | 2/1995  | Kumagai et al. |
| 6,251,523 | B1 | * | 6/2001  | Takahashi et al. ............ 428/428 |
| 7,128,944 | B2 |   | 10/2006 | Becker et al. |

(Continued)

FOREIGN PATENT DOCUMENTS

| DE | 199 18 811 | 11/2000 |
| DE | 100 51 724 | 5/2002 |

(Continued)

OTHER PUBLICATIONS

DE10-2005020168 English Machine translation.*

(Continued)

*Primary Examiner* — David Sample  
*Assistant Examiner* — Lauren Colgan  
(74) *Attorney, Agent, or Firm* — Staas & Halsey LLP

(57) ABSTRACT

A transparent porous SiO2-coating for a transparent substrate material has improved optical properties. These properties can be obtained, in particular, by plasma treatment.

16 Claims, 2 Drawing Sheets

(56) References Cited

U.S. PATENT DOCUMENTS

| | | | |
|---|---|---|---|
| 7,604,866 B2 * | 10/2009 | Ohashi et al. | 428/446 |
| 2003/0170465 A1 | 9/2003 | Krzyzak et al. | |
| 2006/0128563 A1 | 6/2006 | Vogl | |
| 2006/0154044 A1 * | 7/2006 | Yamada et al. | 428/312.2 |
| 2006/0269724 A1 * | 11/2006 | Ohashi et al. | 428/143 |
| 2006/0281828 A1 * | 12/2006 | Nakayama et al. | 522/71 |
| 2008/0079894 A1 | 4/2008 | Matheron et al. | |
| 2009/0220774 A1 * | 9/2009 | Imai et al. | 428/331 |
| 2010/0009195 A1 | 1/2010 | Berndt et al. | |
| 2010/0027123 A1 * | 2/2010 | Imai et al. | 359/586 |
| 2010/0136319 A1 * | 6/2010 | Imai et al. | 428/315.5 |
| 2010/0213164 A1 | 8/2010 | Eder et al. | |

FOREIGN PATENT DOCUMENTS

| | | | |
|---|---|---|---|
| DE | 102 09 949 | | 9/2003 |
| DE | 10 2005 020 168 | | 11/2006 |
| DE | 10-2005020168 | * | 11/2006 |
| EP | 0 564 134 | | 12/1999 |
| EP | 1 669 331 | | 6/2006 |
| FR | 2874007 | | 2/2006 |
| JP | 53-137269 | | 11/1978 |
| JP | 56-84729 | | 7/1981 |
| JP | 6-73208 | | 3/1994 |
| JP | 8-90745 | | 4/1996 |
| JP | 8-319109 | | 12/1996 |
| JP | 2010-505016 | | 2/2010 |
| JP | 2010-538816 | | 12/2010 |
| WO | WO 03/052003 A1 | | 2/2003 |

OTHER PUBLICATIONS

Bewig et al. (DE 102005020168) English machine translation.*
Yamaguchi et al.: Anti-Reflective Coatings of Flowerlike Aluminia on Various Glass Substrates by the Sol-Gel Process with the Hot Water Treatment; Journal of Sol-Gel Science and Technology, 2005, 33, p. 117-120.
M. Walther: Industrielle Umsetzung der Sol-Gel-Technologie für großflächige Anti Reflex Beschichtungen, OTTI-Seminar Regensburg, Sep. 2005.
German Office Action for related German Patent Application No. 10 2007 043 653.1, issued on Jul. 4, 2012.
Japanese Office Action issued Aug. 12, 2013 in corresponding Japanese Application No. 2010-524437.
A. T. Cho et al., "Plasma Treatments of Molecularly Templated Nanoporous Silica Films", Electrochemical and Solid-State Letters, vol. 4, No. 4, 2001, pp. G35-G38.
Alagappan Palaniappan et al., "Preparation of Mesoporous Silica Films Using Sol-Gel Process and Argon Plasma Treatment", Chemical Physics Letters, vol. 395, 2004, pp. 70-74.
C. Ballif et al., "Solar Glass with Industrial Porous $SiO_2$ Antireflection Coating: Measurements of Photovoltaic Module Properties Improvement and Modeling of Yearly Energy Yield Gain", Solar Energy Materials & Solar Cells, vol. 82, 2004, pp. 331-344.
European Opposition dated Nov. 27, 2013 in corresponding European Application No. 08803016.8.

* cited by examiner

TRANSPARENT POROUS SIO₂-COATING FOR A TRANSPARENT SUBSTRATE MATERIAL HAVING IMPROVED OPTICAL PROPERTIES

CROSS REFERENCE TO RELATED APPLICATIONS

This application is based on and hereby claims priority to PCT Application No. PCT/EP2008/060592 filed on Aug. 12, 2008 and DE Application No. 10 2007 043 653.1 filed on Sep. 13, 2007 the contents of which are hereby incorporated by reference.

BACKGROUND

The present invention relates to the field of transparent materials, in particular transparent materials whose reflection is reduced.

With many transparent materials, in particular transparent materials based on plastic, such as for instance polycarbonate etc., the difficulty arises that these have, in part, unwanted reflection properties, which hamper or even render impossible their use in many applications.

Numerous attempts were thus undertaken to design transparent materials to be less reflective, in particular by applying further layers.

To this end, it was proposed for instance, by a so-called "flower-like alumina" layer, to reduce the reflection (see Yamaguchi et al, Journal of Sol-Gel Science & Technology, 2005, 33, 117-120). This procedure nevertheless requires a tempering step with increased temperatures (approx. 400° C.).

Other proposed coatings include multi-layer systems with changing refractive indices, e.g. multi-layer systems made of $SiO^2$ and $TiO^2$. Tempering steps, generally at temperatures above 400° C., are also needed here (see M. Walther, OTTI-Seminar Regensburg, September 2005). Other systems use layers made of $TiO^2$ and $MgF^2$ (see EP 564 134 B1), in which additional fluorocarbon resins are provided. This system is in turn disadvantageous in respect of poor applicability.

SUMMARY

The object is therefore to create a transparent coating for a transparent substrate material, which overcomes the aforecited disadvantages at least partially and can in particular be applied in a simple manner.

Accordingly, the inventor proposes a transparent coating for a transparent substrate material, which is characterized in that the coating is based on $SiO^2$, has a porosity of ≥35% and ≤65% and the transmission according to the wipe test amounts to ≥95%.

The term "based on $SiO^2$" within the meaning of this description means or includes in particular that the coating contains $SiO^2$ as a main component. Preferably ≥70%, even more preferably ≥80% and most preferably ≥90% to ≤100 of the coating is made of $SiO^2$.

The term "transparent" within the meaning of this description means or includes here in particular a permeability of ≥90% in the wavelength range used respectively, in particular in the visible wavelength range.

The term "transmission according to the wipe test" relates here in particular to the measurement of the transmission according to the wipe test, as described in the method part.

In many applications, such an $SiO^2$ coating can achieve one or several of the following advantages:

- the coating is essentially homogenous to the human eye and a single coating is sufficient for many applications (contrary to the multi-layer systems cited above).
- the coating can, as described again below, with the majority of applications, be applied by simple dip-coating and subsequent plasma treatment in terms of its desired porosity can be introduced so that complicated application steps to be implemented in particular at a high temperature can be avoided.
- the thickness of the manufactured coating amounts, as described again below, in many applications in the range of 50-200 nanometers. It is therefore largely insensitive to thermal and mechanical stress (in particular bending stress) and only marginally influences component dimensions and tolerances.

According to a more preferred embodiment, the porosity of the coating amounts to between ≥40% and ≤60%, still preferred between ≥45% and ≤55%.

According to a preferred embodiment, the transmission according to the wipe test amounts to ≥97%.

A preferred embodiment is characterized in that the thickness of the coating lies between ≥90 nm and ≤130 nm. This has proven particularly favorable for many applications. The thickness of the coating preferably lies between ≥95 nm and ≤115 nm.

A preferred embodiment is characterized in that the refractive index $n^1$ of the coating lies between $≥0.8*\sqrt{n_2}$ and $≤1.2*\sqrt{n_2}$, with $n^2$ being the refractive index of the substrate. In this case, the reflection can be reduced again for many applications. The refractive index $n^1$ of the coating preferably lies between $≥0.9*\sqrt{n_2}$ and $≤1.1*\sqrt{n_2}$.

A preferred embodiment is characterized in that the coating is essentially a porous full mold body, in particular a homogenous porous full mold body, and/or forms such a body.

The term "essentially" refers here in particular to ≥90 vol %, preferably ≥95 vol % of the coating.

As a result, an easily producible and further reflection-reducing coating can be achieved in many applications.

A preferred embodiment is characterized in that the coating has transmission-increasing properties, in particular for light in the visible wavelength range.

The coating is preferably able to increase the transmission of the substrate by ≥2%, preferably by ≥4% in the wavelength range used respectively, in particular in the visible wavelength range.

A preferred embodiment is characterized in that the average diameter of the pores amounts to between ≥1 nm and ≤50 nm. With many applications, this has shown to be particularly favorable for the anti-reflective properties of the coating. The average diameter of the pores preferably amounts to ≥2 nm to ≤40 nm, still preferably ≥3 nm to ≤20 nm.

A preferred embodiment is characterized in that the diameter of ≥90% of the pores amounts to between ≥1 nm to ≤50 nm.

A preferred embodiment is characterized in that the diameter distribution of the pores of the coating essentially follow a log-normal distribution with a half-width of ≤20 nm, preferably ≤10 nm, even more preferably ≤8 nm.

"Essentially" means here that ≥90% of the pores, preferably ≥95% of the pores and most preferably ≥98% of the pores follow this distribution.

A distribution of this type has proven particularly favorable for many applications, since an optically special homogenous coating can thus be achieved.

A preferred embodiment is characterized in that the coating is manufactured by a Sol-Gel method and subsequent plasma treatment.

The inventor also proposes a method for manufacturing a transparent coating for a transparent substrate material, characterized in that the method relates to a Sol-Gel process.

The term "Sol-Gel process or Sol-Gel method" within the meaning of this description means or includes in particular all processes and/or all methods, in which metal precursor materials, in particular metal halogenide and/or metal alkoxide in solution are subjected to hydrolysis and subsequent condensation.

The term "plasma treatment" within the meaning of this description means or includes in particular all processes and/or methods, in which ionized molecules, in particular radicals of a gas, which was generated by an energy source such as high frequency or microwaves, act on the substrate. This is mostly associated with an increase in temperature.

In the case of coatings and/or substrates, it has surprisingly transpired that a significant improvement in the surface quality and further properties can again be achieved in many applications by plasma treatment.

It is noted that within the meaning of this description "plasma treatment" also relates in particular to a corona treatment, even if this is often handled differently in terms of linguistic use. A plasma treatment within the meaning of this description thus explicitly also includes a corona treatment; this represents in particular a preferred embodiment.

According to a preferred embodiment, the plasma treatment is implemented as an atmospheric pressure plasma. This has proven very advantageous in many applications.

The term "atmospheric pressure plasma" within the meaning of this description means or includes in particular all processes and/or methods, in which a plasma is applied to a substrate under atmospheric environmental conditions.

The plasma treatment is preferably implemented at a process gas pressure of $\geq 2$ bar to $\leq 8$ bar. This has proven to be advantageous with many applications. The process gas pressure preferably lies at $\geq 3$ bar to $\leq 6$ bar, preferably $\geq 3.5$ bar to $\leq 5$ bar.

The plasma treatment is preferably implemented with high voltage and/or rotation of the nozzle.

A preferred embodiment is characterized in that during at least one part of the Sol-Gel process, at least one porosity-producing component is present, which is removed and/or destroyed upon termination of the Sol-Gel process.

The porosity-producing component is preferably removed and/or destroyed at least partly by the plasma treatment.

A preferred embodiment is characterized in that the at least one porosity-producing component is a polymer, with the average molar mass of the polymer preferably amounting to between $\geq 5000$ Da and $\leq 50000$ Da, still preferably between $\geq 10000$ Da and $\leq 35000$ Da.

A preferred embodiment is characterized in that the polymer is an organic polymer, preferably selected from the group containing polyethylene glycol, polypropylene glycol, copolymers made of polyethylene glycol and polypropylene glycol, polyvinylpyrrolidone, polyether, alkyl, cycloalkyl and/or aryl-substituted polyether, polyester, alkyl-, cycloalkyl- and/or aryl-substituted polyester, in particular polyhydroxy butanoic acid or mixtures thereof.

General groups/molecule definition: General groups or molecules, such as alkyl, alkoxy, aryl etc. are described. If not described otherwise, the following groups are preferably used within the generally described groups/molecules.
Alkyl: linear and branched C1-C8 alkyls,
Long-chain alkyls: linear and branched C5-C20 alkyls
Alkenyl: C2-C6 alkenyl,
Cycloalkyl: C3-C8 cycloalkyl,
Alkoxide/alkoxy: C1-C6 alkoxy, linear and branched
Long-chain alkoxide/alkoxy: linear and branched C5-C20 alkoxy
Aryl: selected from aromatic compounds with a molecular weight below 300 Da.
Polyether: selected from the group containing H—(O—CH$^2$—CH(R))$^n$—OH and H—(O—CH$^2$—CH(R))$^n$—H, with R being selected independently from: hydrogen, alkyl, aryl, halogen and n from 1 to 250.
Substituted polyether: selected from the group containing R$^2$—(O—CH$^2$—CH(R$^1$))$^n$—OR$^3$ and R$^2$—(O—CH$^2$—CH(R$^2$))$^n$—R$^3$, with R$^1$, R$^2$, R$^3$, being selected independently from: hydrogen, alkyl, long-chain alkyls, aryl, halogen and n from 1 to 250.
Ether: the compound R$^1$—O—R$^2$, with each R$^1$ and R$^2$ being selected independently from the group containing hydrogen, halogen, alkyl, cycloalkyl, aryl, long-chain alkyl.

Except as mentioned otherwise, the following groups/molecules are more preferred groups/molecules within the general groups/molecule definition:
Alkyl: linear and branched C1-C6 alkyl,
Alkenyl: C3-C6 alkenyl,
Cycloalkyl: C6-C8 cycloakyl,
Alkoxy, Alkoxide: C1-C4 alkoxy, in particular isopropyloxide
Long-chain alkoxy: linear and branched C5-C10 alkoxy, preferably linear C6-C8 alkoxy
Polyether: selected from the group containing H—(O—CH$^2$—CH(R))$^n$—OH and H—(O—CH$^2$—CH—(R))$^n$—H, with R being selected independently from: hydrogen, alkyl, aryl, halogen and n from 10 to 250.
Substituted polyether: selected from the group containing R$^2$—(O—CH$^2$—CH(R))$^n$—OR$^3$ and R$^2$—(O—CH$^2$—CH(R$^2$))$^n$—R$^3$, with R$^1$, R$^2$, R$^3$, being selected independently from: hydrogen, alkyl, long-chain alkyls, aryl, halogen and n from 1 to 250.

A preferred embodiment is characterized in that the silicon is added in the form of a silicon alkoxide precursor solution.

A preferred embodiment is characterized in that the pH value of precursor solution containing silicon amounts to between $\geq 1$ to $\leq 6$.

The inventor also proposes a transparent coating for a transparent substrate, manufactured in accordance with the method.

The inventor further proposes an optical component comprising a transparent substrate and a coating applied and/or arranged on the substrate.

A preferred embodiment is characterized in that the substrate is selected from the group containing glass, transparent plastics, preferably selected from the group containing polycarbonate, polyacryl, PMMA and mixtures thereof, as well as mixtures thereof.

The inventor further proposes a method for manufacturing an optical component, characterized in that the coating is applied to the substrate by dip-coating and/or spin-coating and is subsequently subjected to a plasma treatment.

The inventor further proposes the use of a coating and/or an inventive optical component for
    optical instruments
    spectacles
    headlamp housings in automotive engineering
    window glass, particularly in automotive engineering
    cockpit glazing The afore-cited components to be used and described in the application examples are not subject to any particular exceptional conditions in terms of size, design, material choice and technical conception, so that the selection criteria known in the application field can be used unrestrictedly.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
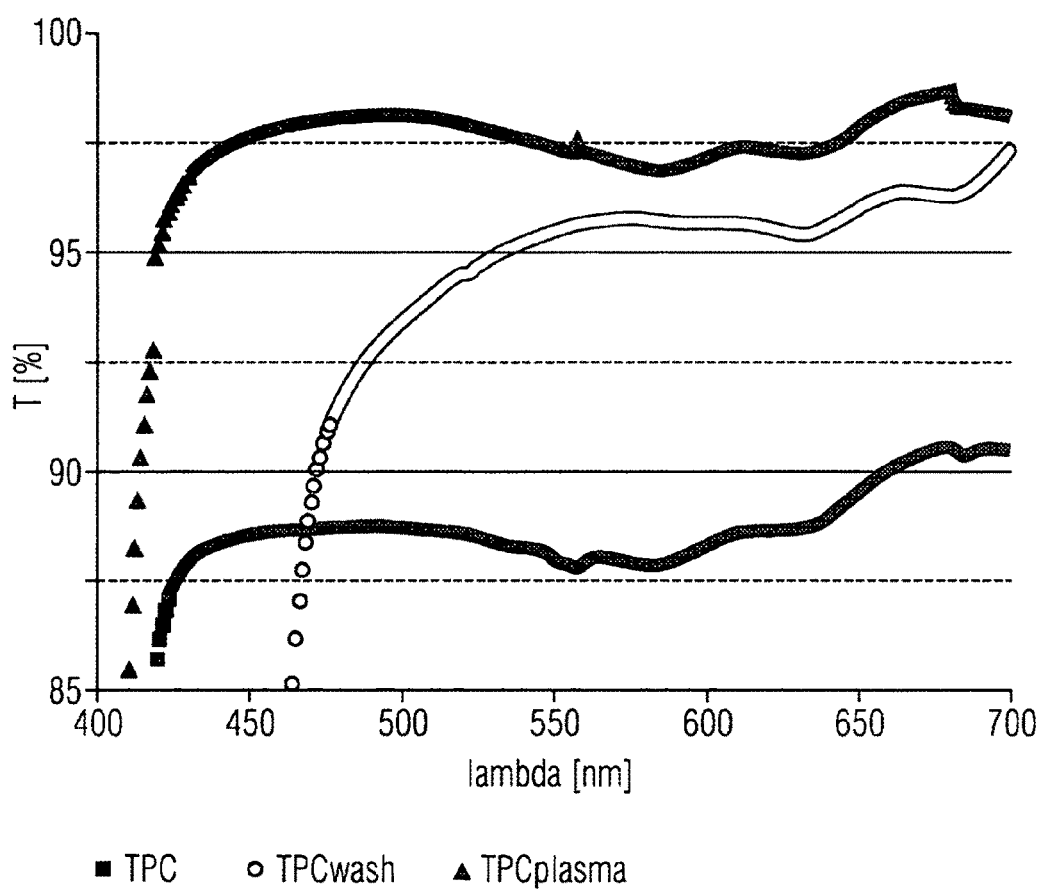
FIG. 1 a diagram with three transmission measurements of a polycarbonate substrate coated in accordance with a first potential embodiment of the invention, a polycarbonate substrate coated in accordance with a comparative method and an uncoated polycarbonate substrate.

Reference will now be made in detail to the preferred embodiments of the present invention, examples of which are illustrated in the accompanying drawings, wherein like reference numerals refer to like elements throughout.

Figure 2:
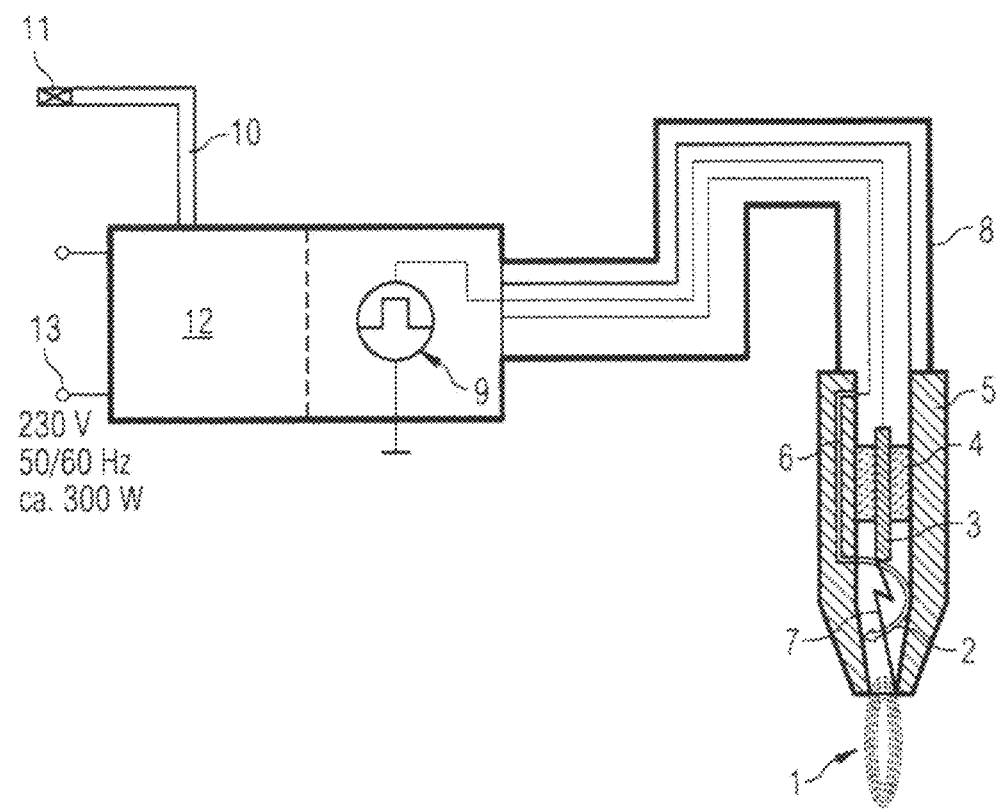
FIG. 2 shows the head of a plasma cannon with emerging plasma and an overall view of the plasma cannon.

FIGS. 1 and 2 relate to the example described below:

EXAMPLE I

An optical component based on polycarbonate was manufactured as follows:

Two solutions were initially prepared:
Solution 1: 4 g polyethylene glycol (molar mass 35000 Da) was prepared in 50 ml of ethanol and slowly added to water while being stirred until a complete solution emerges. 4 drops of 1 N HCl are then added.
Solution 2: 4 ml tetraethoxysilane in 20 ml EtOH Solution 2 was then filled up with solution 1 to 50 ml and stirred for 2 hours.

The polycarbonate substrate was then dip-coated with the solution (speed 55 mm/min). It was then air-dried and tempered at 100° C. for 1 hour in the oven. After cooling, it was placed in water for one minute.

The coating was subsequently subjected to a plasma treatment, a device by the company Plasmatreat was used with a high frequency generator FG 3001 and a rotational nozzle RD 1004, which was equipped with a nozzle head of type AGR123.

The porosity of the coating amounted here to 55%, the transmission in accordance with the wipe test amounted to 97%.

COMPARATIVE EXAMPLE 1

For comparison purposes, a second coating was produced, with the plasma treatment having been left out.

FIG. 1 shows a diagram with three transmission measurements of a polycarbonate substrate according to example I ("TPC plasma"), a polycarbonate substrate according to comparative example I ("TPC wash") and an uncoated polycarbonate substrate ("TPC"). There is a clear improvement in the transmission, particularly in the wavelength range around 400-450 nm both in comparison with the comparison method and the uncoated substrate.

FIG. 2 shows the functional principle of an atmospheric pressure plasma, which relates primarily to a plasma being generated at normal pressure, without an additional reaction vessel, which assists with maintaining a pressure level which differs from the atmospheric pressure.

The core is the plasma generator, in which the central electrode 3, the outer, potential-free electrode 5 and the insulator 4 form a discharge zone. The high voltage generator 8 now converts the mains voltage into the high voltage (5-15 kV, 10-100 kHz), which generates a pulsed arc 7. The supply voltage 13 and the process gas 10, which is usually oil-free pressurized air, are fed to the discharge zone through the flexible gas duct 6. The pressurized air firstly reaches the gas control block 12 by way of the pressurized air connector 11. The gas is passed through a flexible tube 8, in which gas and current supply lines to the discharge zone are accommodated, via the gas duct 6 to the discharge path and is excited in the discharge zone into the plasma state. The air flow transports the developing active species (i+, e−, r*) which develop in the arc 7, out of the discharge zone. A potential-free plasma jet (active gas jet) is produced.

Wipe Test

The transmission according to the wipe test of coatings was measured in the following way:

A 180 g hammer, on the end of which was fastened, by adhesive tape, a standard cleaning fleece from the company Clear Clean "Absormat" saturated with a standard cleaning agent "Sidolin Streifenfrei Zitrus" (Henkel), was pulled across the respective coating 50 times depending on the sample side, without a further vertical force effect.

The transmission of the coating was then measured in the "Haze-Guard PLUS" (Byk-Gardner).

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:
1. A transparent product comprising:
a transparent substrate material; and
a coating layer formed on the substrate material, the coating layer containing at least 50 wt. % $SiO_2$, the coating layer being a porous full mold body having pores produced by a Sol-Gel method using an organic polymer porosity-producing component, and the coating layer having a porosity of from 35% to 65% and a transmission of at least 95% according to wipe test amounts.
2. The product as claimed in claim 1, wherein the coating layer has a thickness of from 90 nm to 130 nm.
3. The product as claimed in claim 1, wherein the coating layer has a refractive index $n_1$ of from $0.8*\sqrt{n_2}$ to $1.2*\sqrt{n_2}$, with $n_2$ being a refractive index of the substrate material.
4. The product as claimed in claim 1, wherein the coating layer is produced by a Sol-Gel method and subsequent plasma treatment.
5. The product as claimed in claim 1, wherein the porosity-producing component is an organic polymer having an average molar mass ranging from 5000 Da to 50000 Da.
6. An optical component comprising:
a transparent substrate; and
a transparent coating formed on the substrate, the transparent coating containing at least 50 wt. % $SiO_2$, the transparent coating being a porous full mold body having pores produced by a Sol-Gel method using an organic polymer porosity-producing component, and the coat- ing having a porosity of from 35% to 65% and a transmission of at least 95% according to wipe test amounts.

7. The optical component as claimed in claim 6, wherein the substrate is formed of at least one material selected from the group consisting of glass and transparent plastics.

8. The optical component as claimed in claim 6, wherein the substrate is formed from at least one material selected from the group consisting of glass, polycarbonate and polyacryls.

9. The optical component as claimed in claim 6, wherein the porosity-producing component is an organic polymer having an average molar mass ranging from 5000 Da to 50000 Da.

10. A transparent product comprising:
   a transparent substrate material; and
   a coating layer formed on the substrate material, the coating layer
      containing at least 50 wt. % $SiO_2$,
      being a porous full mold body formed from a precursor solution,
      having pores produced by a Sol-Gel method using an organic polymer porosity-producing component mixed with the precursor solution, and
      having a porosity of from 35% to 65% and a transmission of at least 95% according to wipe test amounts.

11. The product as claimed in claim 10, wherein the porous full mold body is formed by subjecting an alkoxide-containing solution to a Sol-Gel method, and
   the porous full mold body is a network containing $SiO_2$ formed around spaces occupied by the porosity-producing component.

12. A method for producing the transparent product of claim 1, comprising:
   providing a transparent substrate material; and
   forming a transparent coating on the transparent substrate material using a Sol-Gel process followed by plasma treatment, the transparent coating containing at least 50 wt. % $SiO^2$, the transparent coating having a porosity of from 35% to 65% and a transmission of at least 95% according to wipe test amounts.

13. The method as claimed in claim 12, wherein plasma treatment is performed at a process gas pressure of from 2 bar to 8 bar.

14. The method as claimed in claim 12, wherein
   a porosity-producing component exists during at least one part of the Sol-Gel process, and
   the porosity-producing component is at least partially removed during the plasma treatment upon termination of the Sol-Gel process.

15. The method as claimed in claim 12, wherein the coating is applied to the transparent substrate material in the Sol-Gel process by at least one of dip-coating and spin-coating.

16. A method of using a transparent element, comprising:
   providing the optical component as claimed in claim 6; and
   using the optical component in at least one of:
      an optical instrument,
      eyeglasses,
      a headlamp housing in automotive engineering,
      an automotive window glass, and
      a cockpit glazing.

\* \* \* \* \*